United States Patent [19]

Meier et al.

[11] 4,095,803
[45] Jun. 20, 1978

[54] KEYWAY OIL SEAL ASSEMBLY

[75] Inventors: Charles David Meier, Hartsville; Shelby Lewis Olvey, Columbus, both of Ind.

[73] Assignee: Cummins Engine Company, Inc., Columbus, Ind.

[21] Appl. No.: 827,049

[22] Filed: Aug. 23, 1977

[51] Int. Cl.² .......................... F01P 5/10; F16J 15/40
[52] U.S. Cl. ........................................ 277/12; 277/27; 277/136; 138/89; 403/356; 123/196 R; 123/41.47
[58] Field of Search ............ 123/41.46, 41.47, 196 R; 138/89; 4/295; 403/356, 358, 355, 288; 277/27, 136, 12, 137, 212 C

[56] References Cited

U.S. PATENT DOCUMENTS 2,571,352  10/1951  Fast ................................. 403/356 X
3,200,984   8/1965  Fueslein et al. .................... 138/89 X

FOREIGN PATENT DOCUMENTS 810,498  3/1959  United Kingdom ................ 403/358
958,115  5/1964  United Kingdom ................ 403/356

Primary Examiner—Robert S. Ward, Jr.
Attorney, Agent, or Firm—Gary M. Gron; Robert T. Ruff

[57] ABSTRACT

The disclosure illustrates an oil seal assembly for a keyway which receives a pin for an interconnection between an accessory drive pulley and a shaft extending from a diesel engine accessory drive gear box. The oil seal consists of an L-shaped elastomeric seal with one leg of the L extending into the keyway and the other leg providing a shoulder which abuts the shaft adjacent the keyway end. A nut threaded onto the end of the shaft holds a washer against the L-shaped seal thus compressing it. So compressed, the seal expands against the walls of the keyway to form an effective seal against the flow of oil therethrough. Preferably, the seal is formed from material which swells exceedingly when immersed in petroleum products. As a result, any leakage causes the seal to expand and stop further oil flow.

11 Claims, 5 Drawing Figures

4,095,803

KEYWAY OIL SEAL ASSEMBLY

The present invention relates to seal assemblies and more particularly to such assemblies for use with interconnected telescoped members.

In many types of machinery a rotatable output element, such as a pulley or gear, is telescoped over a drive shaft and held on the shaft so that the two parts do not slip relative to one another. In some cases a keyway is formed in one of the parts and a Woodruff key, straight key or pin is connected to the other and received in the keyway. In other cases the output element is pressed over the shaft with an interference fit and held against a shoulder by a nut. In this case if it is necessary to index the pulley relative to the shaft a keyway and key or pin are used for that purpose.

Very often the shaft will project from a gear box having an oil supply for lubrication. Seals are formed around the periphery of the shaft to prevent flow of oil out of the gear box. However, the keyway slot represents an additional path for oil. In the past, attempts have been made to provide a seal in this keyway. However, these attempts have either been ineffective or too expensive.

The above problems are solved in accordance with the present invention by a seal for use with first and second telescoped members, one of which has a groove and the other a relatively rigid key and the like extending into the groove to prevent, at least in part, relative rotation of the members. A resilient seal has a first portion received in the groove and a second portion forming a shoulder which abuts an end face of one of the members adjacent the end of the groove. A relatively rigid element connected to one of the members compresses the resilient seal against the end of the keyway to expand the end of the keyway and prevent flow of liquid through the keyway.

The above and other related features of the present invention will be apparent from a reading of the following description of the disclosure shown in the accompanying drawings and the novelty thereof pointed out in the appended claims.

Figure 1:
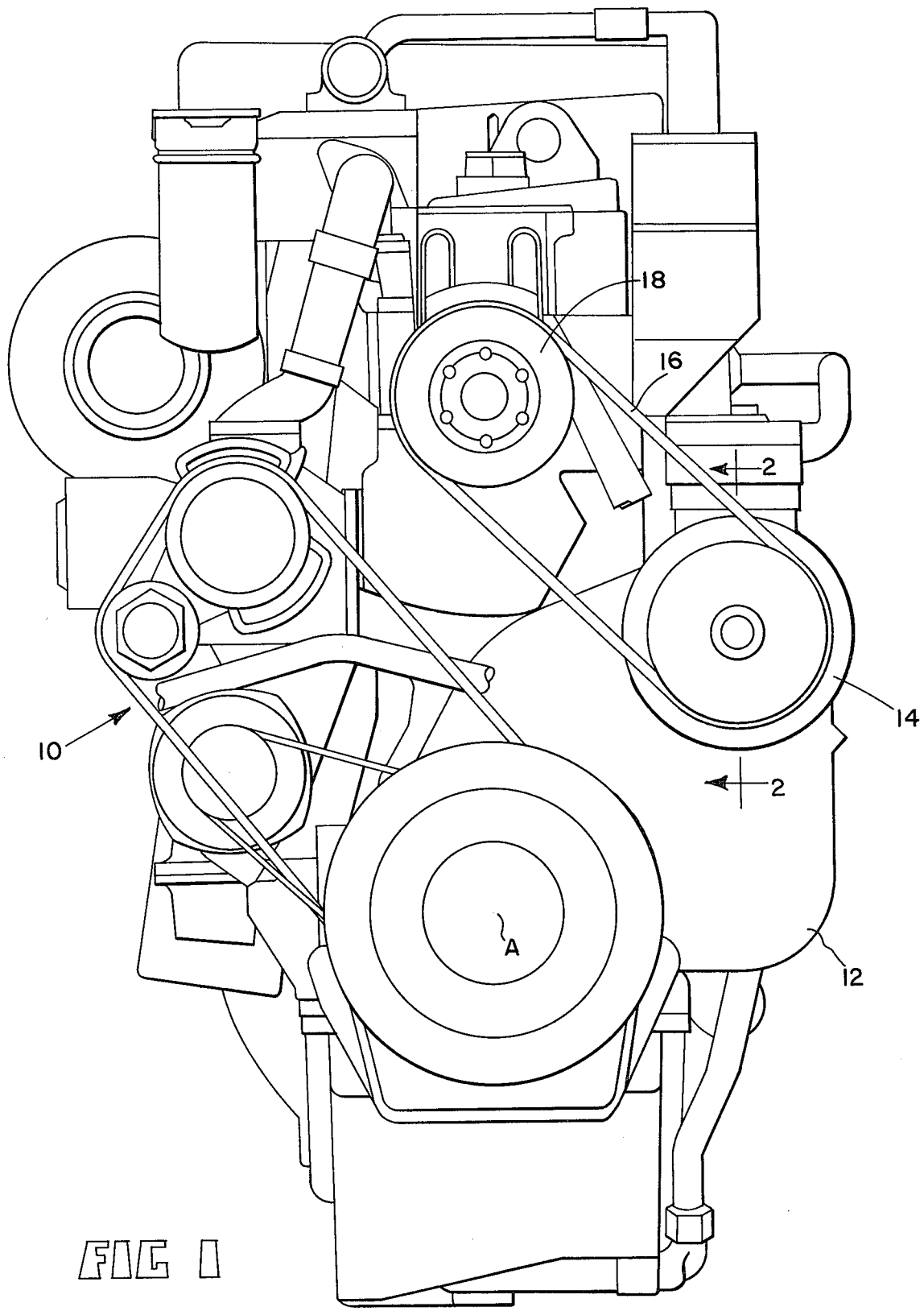
FIG. 1 is a front end view of an internal combustion engine which may incorporate the seal assembly forming the present invention.

Referring to FIG. 1, there is shown an internal combustion engine 10 of the reciprocating type in which a crankshaft provides a rotatable output. The engine incorporates an accessory gear box 12 which takes the rotary output of the crankshaft (not shown but positioned on center line A) and through a series of intermeshing gears, provides a rotatable output on a pulley assembly 14. Pulley 14 engages an endless flexible belt 16 extending to an idler pulley 18 which forms a mounting for a fan (not shown).

Figure 2:
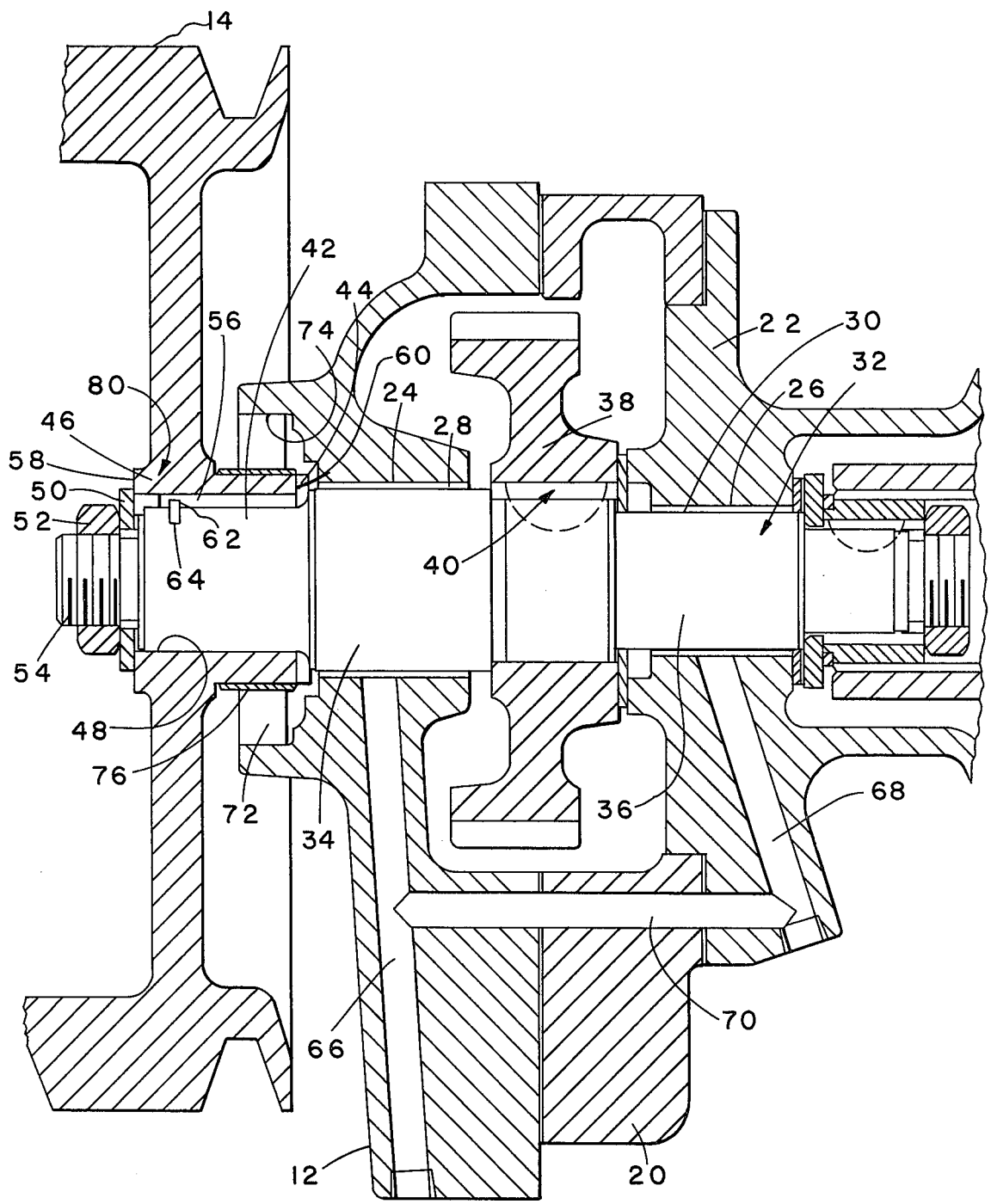
FIG. 2 is an enlarged fragmentary sectional view of the gear box shown in FIG. 1 and taken on lines 2—2 of FIG. 1, this section illustrating the seal assembly of the present invention.

FIG. 2 shows a section of the gear box 12 taken through the center line of the pulley assembly 14. Gear box housing 12 is secured to an extension 20 of the engine block for engine 10 by suitable attaching screws (not shown). An aft housing 22 is also attached to extension 20 of the engine block. Housings 12 and 22 have openings 24 and 26 respectively which receive sleeve bearings 28 and 30. The sleeve bearings receive a shaft 32 at journals 34 and 36. A drive gear 38 is telescoped over shaft 32 and held in place by a Woodruff key assembly generally referred to at 40. The shaft 32 has a nose portion 42 which extends from a shoulder 44 formed at one end of journal 34. The hub 46 of pulley 14 has an opening 48 which fits over the nose portion 42 with an interference fit. A washer 50 and nut 52 screwed onto a threaded portion 54 of nose portion 42 hold the hub 46 against the shoulder 44.

In the gear box illustrated above the pulley 14 is prevented from rotating relative to shaft 32 by the interference fit and by pressing the pulley against the shoulder 44. However, it is necessary in some cases to have the pulley in a predetermined angular position relative to the shaft 32. For this purpose an axially extending keyway 56 is formed between opposite end faces 58 and 60 of hub 46. A pin 62 is received in a hole 64 in nose portion 42 and extends into the keyway 56 thus maintaining the pulley and shaft in a predetermined angular position relative to one another.

The sleeve bearings 28 and 30 receive oil from feed passages 66, 68 and cross passage 70 which deliver lubricating fluid from a suitable source to the mid section of the sleeve bearings 28 and 30. Some of the oil escaping from sleeve bearing 28 passes forward to the end face 60 of hub 46. A suitable radial seal assembly 72 pressed into a recess 74 in housing 12 contacts a sleeve-like seal surface 76 on the periphery of hub 46 to prevent the flow of lubricating fluid passed the outside of hub 46. However, an additional path for leakage of lubricating fluid is presented in the above arrangement. This path is through the keyway 56 from end face 60 which exposed to lubricating fluid from the sleeve bearing 28. In accordance with the present invention, the seal generally indicated at 80 is provided to prevent flow of lubricating fluid out of the keyway and thence out of the engine.

Figure 3:
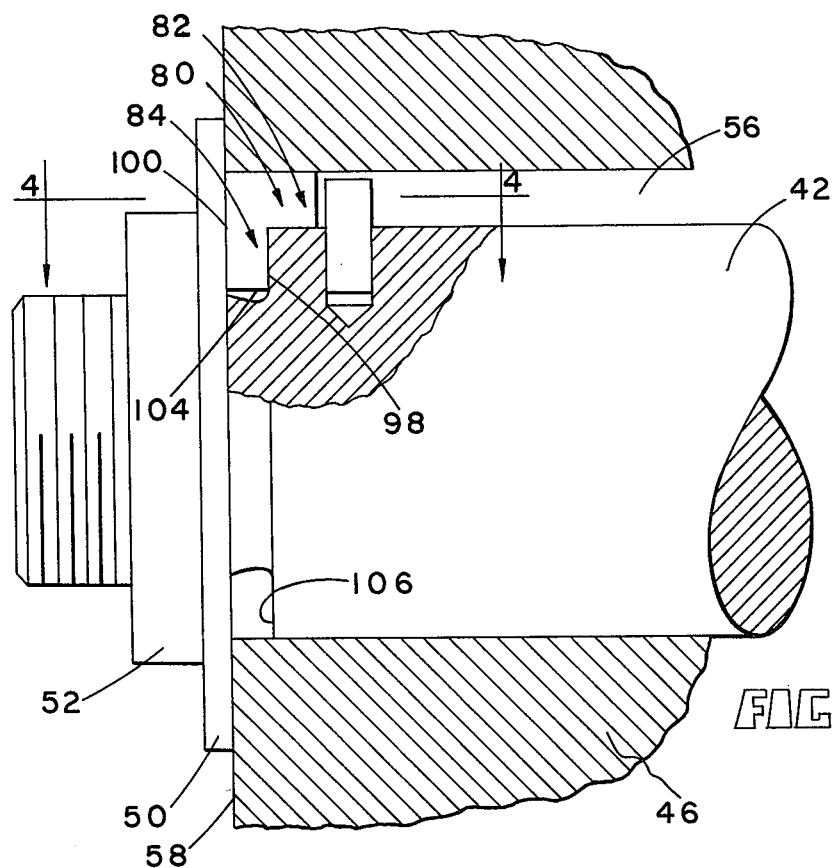
FIG. 3 is a greatly enlarged fragmentary sectional view of the seal assembly shown in FIG. 2.
Figure 4:
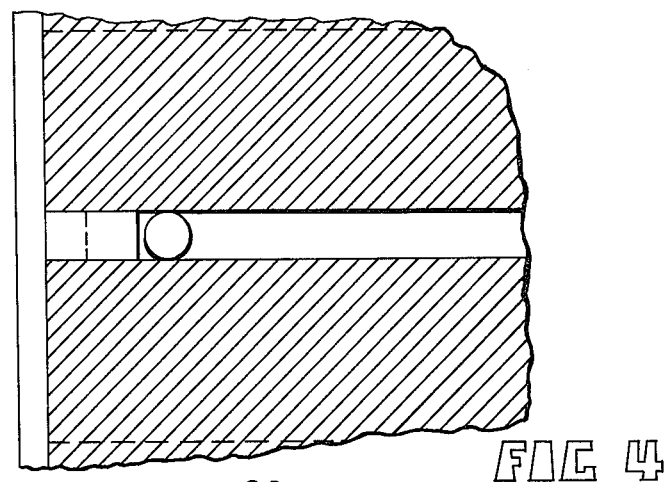
FIG. 4 is a sectional view taken on lines 4—4 of FIG. 3.
Figure 5:
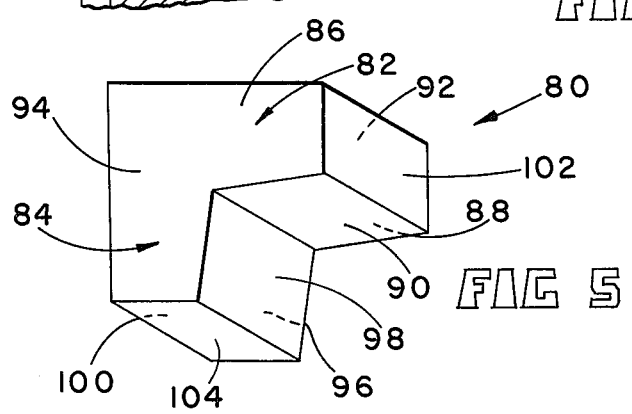
FIG. 5 is a prospective view of the seal assembly of FIG. 3.

FIGS. 3–5 show the seal in expanded detail. The seal 80 has an L-shaped configuration comprising a first leg 82 and a second leg 84. Leg 82 has opposed side walls 86, 88 and side walls 90, 92. Leg 84 has opposed sides 94, 96 and opposed side walls 98 and 100. Side walls 94, 86 and side walls 96, 88 are co planar. These sets of side walls are parallel to one another. However, side walls 92, 90 and 98, 100 are not parallel but have a taper toward the end walls 102, 104 of legs 84, 82. The seal 80 preferably is formed from elastomeric material that has a high degree of swelling when immersed in petroleum products such as commonly used for the gear box. An example of such a material is ethylene propolene rubber material. This material is available from many large chemical companies.

It should be noted that the keyway oil seal has identical legs 82 and 84 so that either one may be inserted into keyway 56. Assuming that leg 82 was inserted into keyway 56, side wall 98 of leg 84 forms a shoulder which is pressed against a shoulder 106 on nose portion 42 of shaft 32. When washer 50 is held against end face 58 of hub 46 it presses against end wall 100 of seal 80 and compresses leg 84 against shoulder 106. The resultant expansion presses the side walls 86, 92 and 88 of leg 82 against the cross walls of the keyway 56 to form an effective seal. It should be noted that the distance between the side walls 86 and 88 is selected so that the seal 80 is easily inserted into the keyway 56 since the compression of the seal the washer 50 will cause it to expand and form an effective seal. The tapered walls 90 and 98 further facilitate installation of seal 80. Since the seal is formed from material that swells when immersed in oil, any leakage into the keyway will cause it to swell and expand thus eliminating further flow of oil.

The present invention has been described in connection with the accessory gear box of an internal combustion engine. It should be noted, however, that it has application to gear boxes of other types and an even broader application to interconnected telescoped shafts. It should also be apparent that modifications may be effected by those skilled in the art without departing from its spirit and scope.

Having thus described the invention what is novel and desired to be secured by letters patent of the United States is:

1. Apparatus comprising:
   a first member
   a second member telescoped over said first member,
   means for forming a groove extending axially from an end face of one of said members and a relatively rigid key and the like connected to the other of said members and projecting into said groove to prevent, at least in part, relative rotation of said members.
   a resilient seal having a first portion receivable in one end of said groove and a second portion forming a shoulder abutting the end face of one of said members adjacent said keyway; and
   a relatively rigid element connected to one of said members for compressing said resilient seal against the end of said groove, thereby expanding said seal to abut the walls of said groove and form a barrier against the passage of liquid through said groove.

2. Apparatus as in claim 1 wherein said resilient seal is L shaped with one leg of the L extending into said groove and the other leg forming said shoulder.

3. Apparatus as in claim 2 wherein said leg of said resilient seal has four sides, two of which taper toward the end of said leg.

4. Apparatus as in claim 3 wherein said resilient seal has substantially equally shaped legs.

5. Apparatus as in claim 1 wherein said resilient seal is formed from material which exhibits substantial expansion when exposed to petroleum products;
   whereby lubricating oil passing through said groove causes said resilient element to expand against the walls of said groove and prevent further leakage of oil.

6. Apparatus as in claim 5 wherein said resilient seal is formed from ethylene propolene.

7. Apparatus as in claim 1 wherein:
   said first member is a shaft;
   said second member is a pully, said groove being formed through said pulley;
   said rigid element is connected to said shaft.

8. Apparatus as in claim 7 wherein said shaft has a shoulder formed adjacent the end of said groove and the shoulder of said resilient element abuts the shoulder on said shaft.

9. Apparatus as in claim 8 wherein said resilient seal is L-shaped with one leg of the L extending into the groove and the other leg abutting the shoulder on said shaft, each leg of said resilient seal having four sides, two of which taper toward the end of said leg.

10. Apparatus as in claim 9 wherein said key comprises a pin received in said shaft and projecting radially outward into said groove.

11. Apparatus as in claim 10 wherein said resilient seal is formed from ethylene propolene.

* * * * *